United States Patent
Saeki

(10) Patent No.: US 7,403,218 B2
(45) Date of Patent: Jul. 22, 2008

(54) IMAGE PROCESSING SYSTEM AND IMAGE PROCESSING METHOD

(75) Inventor: Kazuhito Saeki, Osaka (JP)

(73) Assignee: Keyence Corporation, Osaka (JP)

( * ) Notice: Subject to any disclaimer, the term of this patent is extended or adjusted under 35 U.S.C. 154(b) by 766 days.

(21) Appl. No.: 10/689,756

(22) Filed: Oct. 21, 2003

(65) Prior Publication Data

US 2004/0135884 A1    Jul. 15, 2004

(30) Foreign Application Priority Data

Oct. 23, 2002    (JP)    ............ P 2002-308005

(51) Int. Cl.
*H04N 7/18*    (2006.01)
(52) U.S. Cl. ............................ 348/61; 348/86
(58) Field of Classification Search .............. 348/61, 348/86; 382/143; 209/585
See application file for complete search history.

(56) References Cited

U.S. PATENT DOCUMENTS

| | | | | |
|---|---|---|---|---|
| 4,860,096 A | * | 8/1989 | Long et al. | 348/61 |
| 4,972,494 A | * | 11/1990 | White et al. | 382/143 |
| 5,184,733 A | * | 2/1993 | Arnarson et al. | 209/585 |
| 5,311,599 A | | 5/1994 | Freischlad | 382/8 |
| 5,970,166 A | | 10/1999 | Nichani | 382/141 |
| 2001/0012395 A1 | | 8/2001 | Michael et al. | 382/152 |

FOREIGN PATENT DOCUMENTS

| JP | 09-297864 | 11/1997 |
|---|---|---|
| JP | 2001-125440 | 5/2001 |

OTHER PUBLICATIONS

European Search Report for EP 03 02 4432 dated Aug. 10, 2004.
Pech-Pacheco et al., "Automatic Slide Scanning," World Scientific, Chapter 13, p. 259-288 (2001).

* cited by examiner

*Primary Examiner*—Allen Wong
(74) *Attorney, Agent, or Firm*—Kilyk & Bowersox, P.L.L.C.

(57) ABSTRACT

An image processing apparatus has a trigger receiving section for receiving an external trigger and a trigger generation section including a timer. When a trigger from the outside is inputted, in synchronization with this trigger, the timer of the trigger generation section operates and a predetermined number of internal triggers are generated at predetermined intervals. After each image pickup data picked up by the external trigger and the internal triggers is processed by an image processing section statistical processing is internally performed by a statistical processing section and the maximum value, the minimum value, the average value, etc. of variations in the workpiece are calculated and the results are outputted.

12 Claims, 6 Drawing Sheets

IMAGE PROCESSING SYSTEM AND IMAGE PROCESSING METHOD

BACKGROUND OF THE INVENTION

1. Field of the Invention

This invention relates to an image processing system and an image processing method.

2. Description of the Related Art

An image processing system used for positioning of a robot arm, decision on width of sheet material or inspection of a liquid level inside a vessel is constructed so that, as basic processing, a measured object (hereinafter referred as workpiece) is picked up by a trigger from the outside and various measurements are made on a static image inside a window set.

For example, in the case of measuring a workpiece transferred by a conveyor, when displacement occurs in a static image inside a window by vibration of a width direction of the conveyor, variations occur in image processing measured values of an edge position.

FIG. 8 is a diagram conceptually describing this problem. Displacement of the workpiece w occurs in a measurement direction at the time of performing an image pickup and when it is assumed that displacement of the workpiece w inside a window 1 occurs in the range of a distance L in a measurement direction shown by an arrow, variations occur in image processing measured values of an edge position.

In general, the user side has to cope with such a problem and , the problem of the variations in the measured values described above is solved by inputting plural triggers from the outside and picking up images every each trigger and statistically processing the outputs by an external device such as a personal computer and averaging the outputs.

However, a solution method of the above conventional technology is performed in the user side, and it is required that plural triggers should be inputted from the outside. Further, an external device for performing statistical processing is required.

SUMMARY OF THE INVENTION

Therefore, an object of the invention is to provide an image processing system and an image processing method capable of solving the problem described above without entrusting a user.

In order to accomplish the object above, the following means are adopted. According to the invention, there is provided an image processing system comprising:

a camera for picking up a workpiece; and an image processing apparatus for capturing image pickup data of the workpiece picked up by the camera and performing image processing, the image processing apparatus including a trigger receiving section for receiving a trigger from an outside, a trigger generation section for generating a predetermined number of internal triggers at predetermined intervals when the trigger receiving section receives the trigger from the outside, an image processing section for performing image processing with respect to each the image pickup data picked up by the camera by the trigger from the outside and the internal triggers, and a statistical processing section for performing statistical processing of each image processing result data from the image processing section.

That is, according to the invention, in the case of receiving an external trigger performed in a conventional technology, in addition to starting an image pickup, after receiving this external trigger, a predetermined number of internal triggers are generated at predetermined intervals. By each the internal trigger, the image pickup is performed and also measured values obtained from each image pickup data are statistically processed by the statistical processing section included in the image processing apparatus.

Therefore, the need for a user to change setting of a factory device so as to supply plural external triggers to the image processing system separately can be eliminated and also, the need to prepare an external device for performing statistical processing of image data captured plural times can be eliminated.

DETAILED DESCRIPTION OF THE INVENTION

A preferred embodiment of the invention will be described below in detail with reference to the accompanying drawings.

Figure 1:
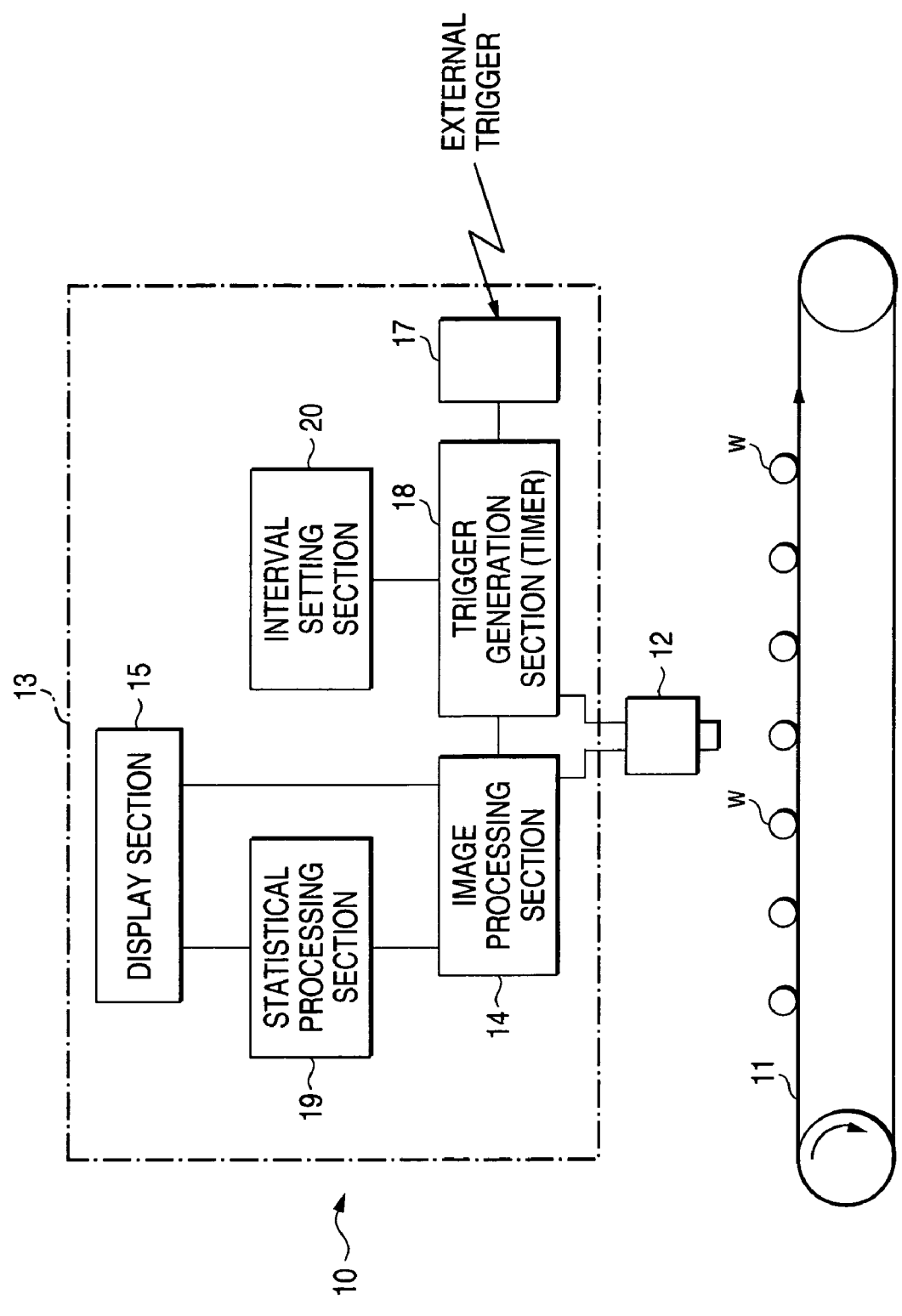
FIG. 1 is a block diagram of an image processing system of an embodiment according to the invention.

FIG. 1 is a diagram showing the entire outline of an image processing system according to the invention. In FIG. 1, an image processing system 10 includes a camera 12 placed toward a workpiece w transferred by, for example, a conveyor 11, and an image processing apparatus 13 connected to the camera 12. In a manner similar to the related-art case, the image processing apparatus 13 has an image processing section 14 for performing image processing of image pickup data and further optionally may have a display section 15 for displaying the result.

The image processing apparatus 13 has a trigger receiving section 17 and a trigger generation section 18 including a timer. When a trigger from the outside (that is, external trigger) is inputted to the trigger receiving section 17, for example, in synchronization with this trigger, the timer of the trigger generation section 18 operates and a predetermined number of internal triggers are generated at predetermined intervals. Image pickup is performed according to each the trigger. The number of generations of this internal trigger is preferably configured so that a user can freely set an arbitrary number of times, two or more times.

Figure 2:
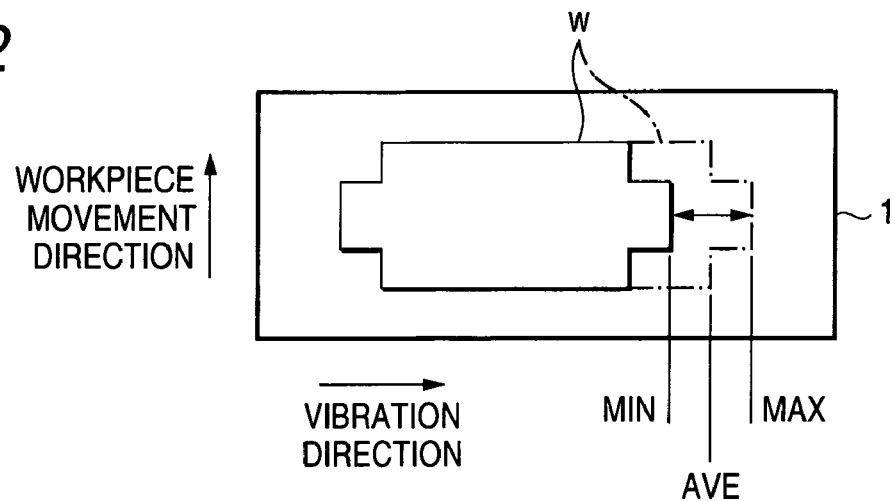
FIG. 2 is a diagram conceptually describing variations in a window associated with position displacement of the workpiece.

The image processing apparatus 13 includes a statistical processing section 19 in the inside and statistical processing of image pickup data captured is performed in the inside of the image processing apparatus 13. As shown in FIG. 2, the maximum value, the minimum value, the average value, etc.

of variations in the workpiece w are calculated and the results are outputted to the display section 15 and/or the outside.

An image displayed in the display section 15 may be an image based on image data picked up according to an external trigger, or may be an image based on image data picked up according to the last trigger of plural internal triggers, or may be an image based on the maximum value or the minimum value described above.

An interval of triggers generated by the internal trigger generation section 18 may be configured so that a user can select this interval from some preset interval time, or an interval setting section 20 in which a user can arbitrarily set or change may be provided. Incidentally, accurate statistical processing result can be obtained by setting interval time so as not to synchronize with a varying period of an edge position of the workpiece.

In the case of performing statistical processing by the statistical processing section 19 of the image processing apparatus 13, it is preferable to decide that data deviating from a predetermined range in measured values calculated during measurement is an abnormal value and set an upper limit value and a lower limit value of data so that the abnormal value can be eliminated from data of the statistical processing. As a result of this, variations in measured values occurring by causes other than a displacements of the workpiece w can be prevented.

Figure 3:
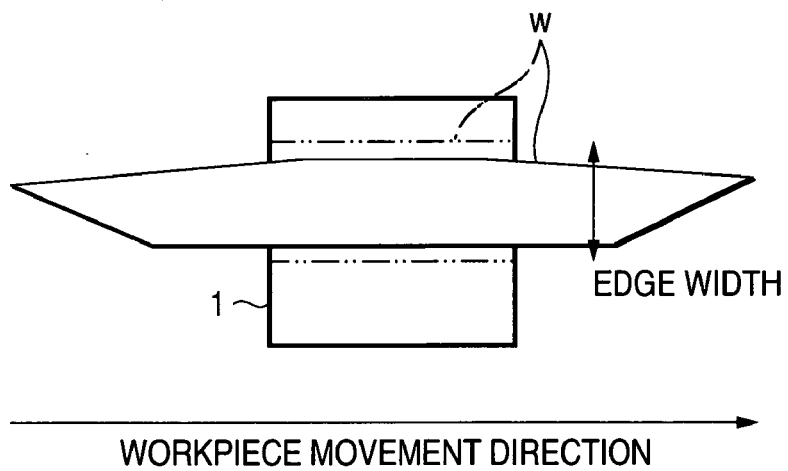
FIG. 3 is a diagram conceptually describing variations in tape as one example of the workpiece to which the invention can be applied preferably.

As shown in FIG. 3, the invention can effectively be applied to band-shaped or line-shaped workpiece w such as cable or tape traveling the front of the camera 12 at a constant speed. With respect to such a workpiece w, for example, after receiving an external trigger in synchronization with a travel start, namely an inspection start of the workpiece w, image data is captured by triggers generated in the inside of the image processing apparatus 13 and thereby the maximum value, the minimum value, the average value, etc. of an edge width can be obtained as measured values for the whole of workpiece w.

Figure 4:
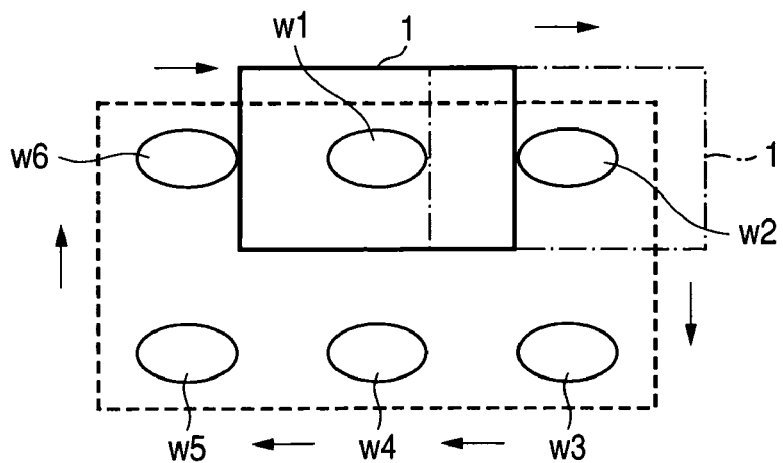
FIG. 4 is a diagram describing application to a measured object in which plural workpieces which are one example of the workpiece to which the invention can be applied preferably are held in, for example, a box.

As shown in FIG. 4, the invention can effectively be applied to plural workpieces w, for example, one half dozen of workpieces w held in a box 21. With respect to the case that the plural workpieces w are held in the box 21 thus, it is configured so as to move the camera 12 as shown by arrows or rotate a mounting table (not shown) of the box 21. When each the workpiece w reaches a position opposite to the camera 12, an image is picked up by internal triggers and statistical processing is performed in the inside of the image processing apparatus 13. Therefore, the maximum value, the minimum value, the average value, etc. of the workpieces w can be obtained in a box unit rather than measured values every each the workpiece w.

Figure 5:
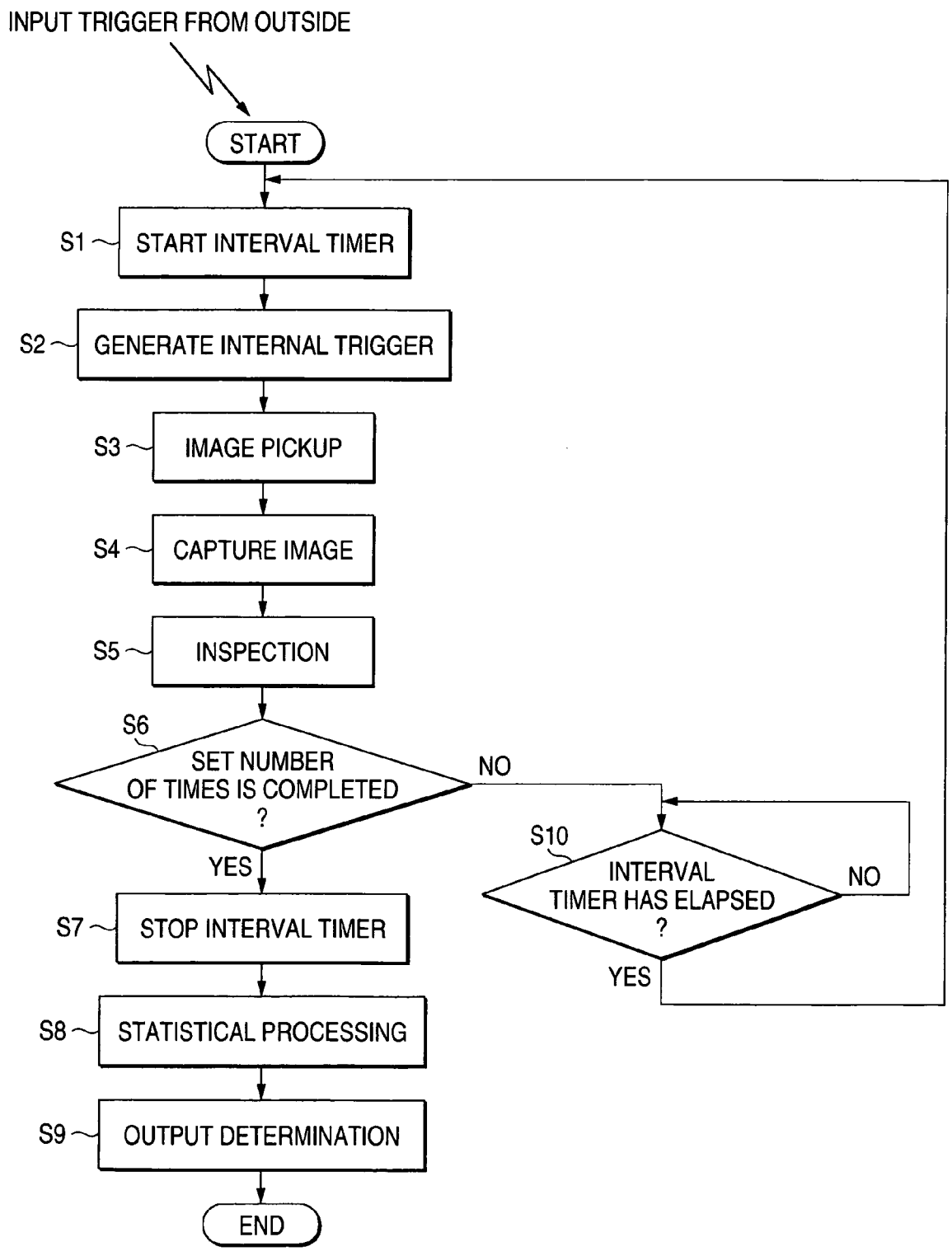
FIG. 5 is a flowchart describing a processing procedure of the case that the invention is applied to the workpiece transferred by a conveyor typically.

FIG. 5 is a flowchart showing one example of a processing procedure performed by the image processing system 10 with respect to the workpiece w transferred by the conveyor 11 (see FIG. 1).

In FIG. 5, when a trigger is inputted to the trigger receiving section 17 from the outside in a manner similar to the related-art case, while an operation of an interval timer of the trigger generation section 18 is started in step S1, an internal trigger is generated in step S2 and an image pickup is performed (step S3).

Image pickup data is captured by the image processing apparatus 13 in the next step S4 and image processing is performed and thereafter, an inspection of the workpiece w, that is, an inspection as to whether or not the workpiece w is, for example, within specifications is made in step S5. This process of steps S2 to S5 is performed a predetermined set number of times. When it is determined that a preset number of times is reached in step S6, the flowchart proceeds to step S7 and the timer of the trigger generation section 18 is stopped and reset. In the next step S8, statistical processing of this predetermined number of measured values such as an edge position is performed by the statistical processing section 19. In step S9, an image indicating, for example, the maximum value is displayed on the display section 15 and/or is outputted to the outside.

When it is determined that a predetermined number of image pickups are not performed in step S6 described above, the flowchart proceeds to step S10 and it is determined whether or not predetermined interval time which is time taken from one image capture to the next image capture has elapsed. When this interval time has elapsed, the flowchart proceeds to step S2 and a trigger is generated by the trigger generation section 18 and in the next step S3, an image pickup of the workpiece w is performed.

As described above, image pickup data is captured by the image processing apparatus 13 in the next step S4 and image processing is performed. Then, for example, an inspection of the workpiece w, that is, an inspection as to whether or not the workpiece w is, for example, within specifications is made in step S5 and this process of steps S2 to S5 is performed a predetermined set number of times.

Figure 6:
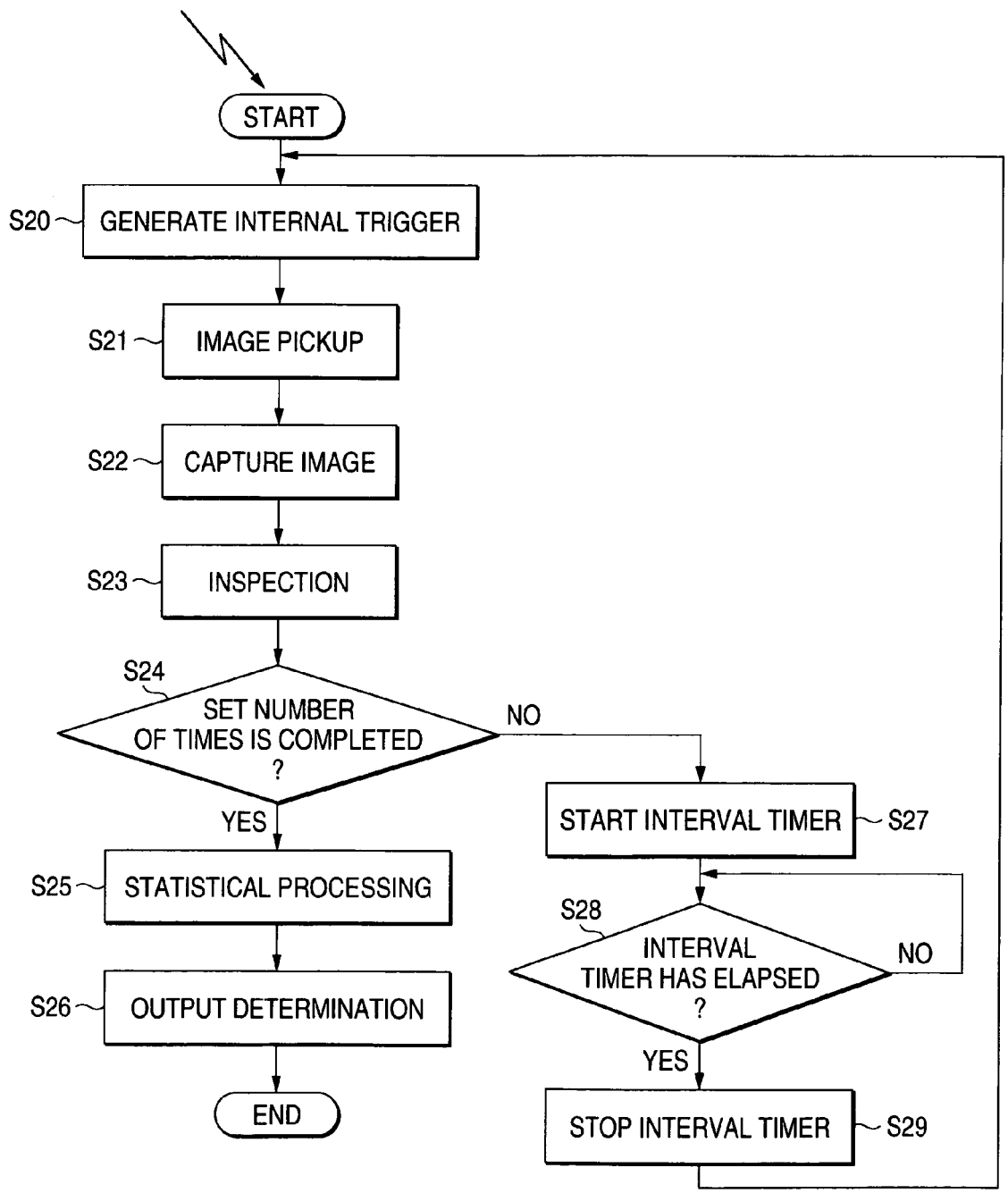
FIG. 6 is a flowchart which is a modified example of the flowchart illustrated in FIG. 5.

FIG. 6 illustrates a modified example of the flowchart illustrated in FIG. 5. This modified example is constructed so that when a trigger is inputted from the outside, an internal trigger is immediately generated in step S20 and a first image pickup is performed (step S21) and capture (step S22) and inspection (step S23) of this first image are performed. Then, the flowchart proceeds to step S27 and an operation of an interval timer, which is used for measuring predetermined interval time taken to the next image capture since one processing was completed, is started. Here, each of steps S20 to S26 shown in FIG. 6 substantially corresponds to each of steps S2 to S9 of FIG. 5.

Figure 7:
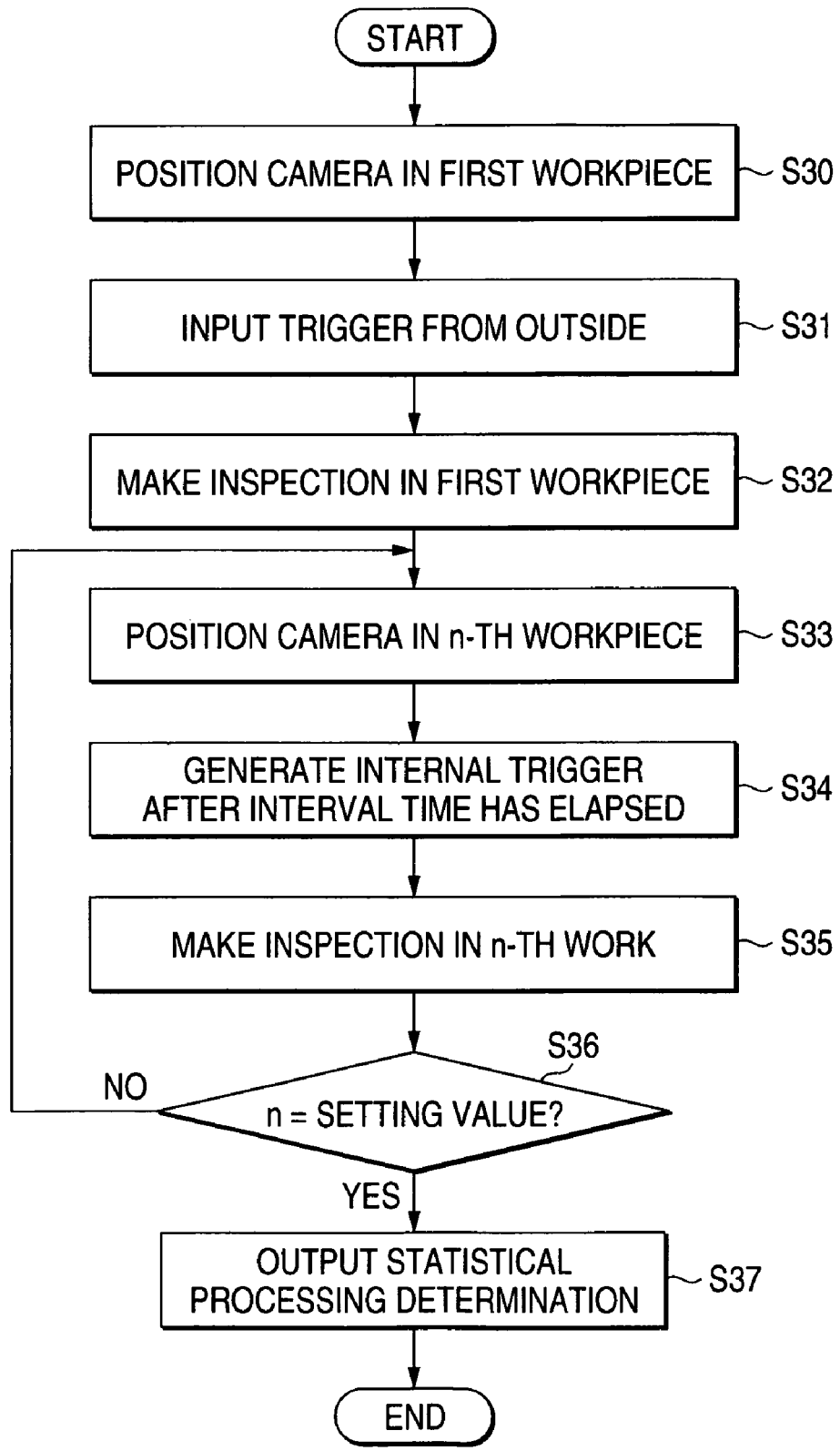
FIG. 7 is a flowchart describing a processing procedure of the case that the invention is applied to plural workpieces held in a box typically.
Figure 8:
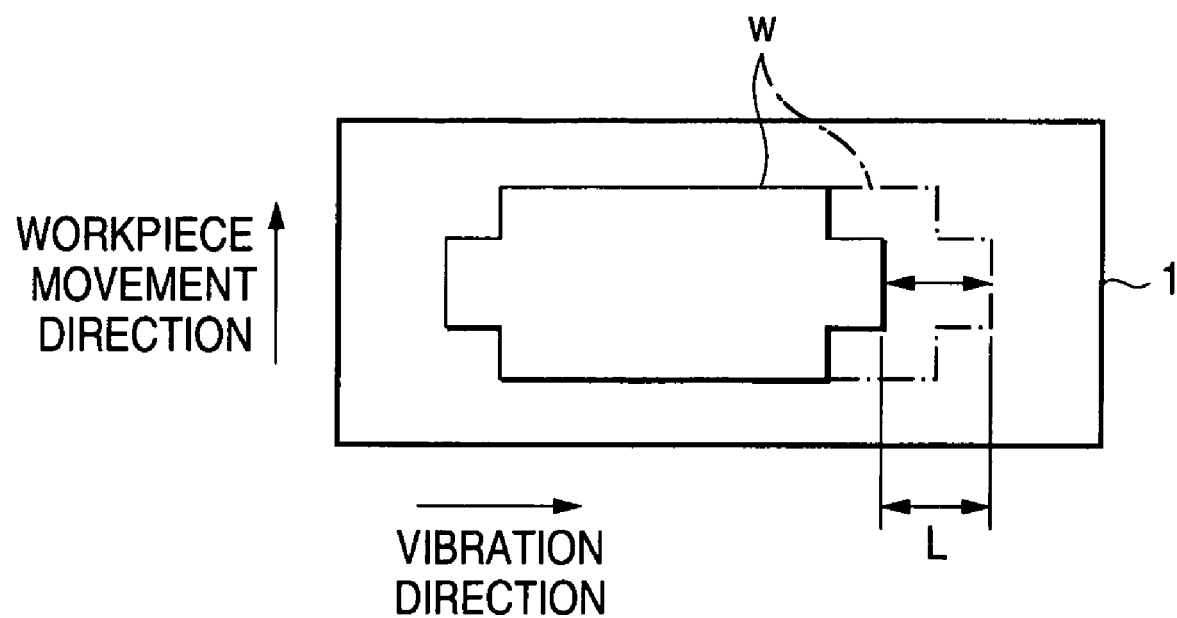
FIG. 8 is a diagram describing a related-art problem associated with position displacement of the workpiece.

FIG. 7 is a flowchart showing one example of a processing procedure of the case that the invention is applied to plural workpieces w held in a box 21 described with reference to FIG. 5. Incidentally, this example is premised on a system picking up plural workpieces w while moving a camera 12.

First, in step S30, a camera 12 is positioned in a position of first workpiece w and in the next step S31, an image pickup is performed by a trigger from the outside. Also, a timer of a trigger generation section 18 starts an operation by this trigger from the outside. Image pickup data is captured by an image processing apparatus 13 in the next step S32 and image processing is performed and thereafter an inspection of the workpiece w is made. Next, in step S33, the camera 12 is positioned in a position of second workpiece w. When predetermined interval time has elapsed and the trigger generation section 18 generates an internal trigger (step S34), image pickup data of this second workpiece w is captured by the image processing apparatus 13 in the next step S35 and image processing is performed and thereafter an inspection of the workpiece w is made. This process of steps S33 to S35 is repeatedly performed by the number of workpieces w held in the box 21. When it is determined that an inspection of the last workpiece w is completed in step S36, the flowchart proceeds to step S37 and statistical processing of measured values of all the workpieces w in the box 21 is performed by a statistical processing section 19. As a result of that, for example, the maximum value of the workpieces w in the box 21 is displayed on a display section 15 and/or is outputted to the outside.

Incidentally, also in this flowchart of FIG. 1, it may be constructed so that first image pickup and inspection are performed immediately based on an external trigger and an internal timer is started after this first processing is completed in a manner similar to the case of FIG. 6.

What is claimed is:

1. An image processing system comprising:

a camera for picking up a workpiece; and an image processing apparatus for capturing image pickup data of the workpiece picked up by said camera and performing image processing, said image processing apparatus including a trigger receiving section for receiving a trigger from an outside to initiate capture of workpiece image pickup data by said camera, a trigger generation section for generating a predetermined number of internal triggers at predetermined intervals via an interval timer after said trigger receiving section receives the trigger from the outside, each of the internal triggers initiating capture of workpiece image pickup data at the predetermined intervals, an image processing section for performing image processing with respect to each of the image pickup data picked up by the camera after receipt of the trigger from the outside and the internal triggers, and a statistical processing section for calculating variations between the image pickup data picked up by the camera after receipt of the trigger from the outside and the image pickup data initiated by the predetermined number of internal triggers and for determining abnormal image pickup data that deviates from a predetermined range and eliminating the abnormal image pickup data from the statistical processing.

2. The image processing system as defined in claim 1, wherein a user can arbitrarily set the number of generations of the internal triggers.

3. The image processing system as defined in claim 1, wherein said image processing apparatus includes a display section for displaying a result calculated by the statistical processing section.

4. The image processing system as defined in claim 1, wherein the statistical processing comprises generating at least one of a maximum value of variation in workpiece position, a minimum value of variation in workpiece position, and an average value of variation in workpiece position.

5. The image processing system as defined in claim 1, wherein the predetermined intervals are set to avoid synchronizing with a period of an edge position of the workpiece.

6. The image processing system as defined in claim 1, wherein the predetermined range has both an upper limit value of data and a lower limit value of data.

7. An image processing method comprising:

receiving an external trigger from the outside to initiate image pickup processing of a workpiece;

generating a predetermined number of internal triggers at predetermined intervals via an interval timer after receiving the trigger from the outside;

picking up workpiece image pickup data by a camera after receipt of each of the external trigger and the internal triggers;

performing image processing with respect to each of the workpiece image pickup data picked up by the camera after receipt of the external trigger and internal triggers; and performing statistical processing to calculate variations between the image pickup data picked up by the camera after receipt of the external triggers and the internal triggers, and determining abnormal image pickup data that deviates from a predetermined range and eliminating the abnormal image pickup data from the statistical processing.

8. The image processing method as defined in claim 7, further comprising:

setting the number of generations of the internal triggers.

9. The image processing method as defined in claim 7, further comprising:

displaying a result calculated from the statistical processing.

10. The image processing method as defined in claim 7, wherein the statistical processing comprises generating at least one of a maximum value of variation in workpiece position, a minimum value of variation in workpiece position, and an average value of variation in workpiece position.

11. The image processing method as defined in claim 7, further comprising setting the predetermined intervals to avoid synchronizing with a period of an edge position of the workpiece.

12. The image processing method as defined in claim 7, wherein the predetermined range has both an upper limit value of data and a lower limit value of data.

* * * * *